United States Patent
Kwon et al.

(10) Patent No.: US 10,319,952 B2
(45) Date of Patent: Jun. 11, 2019

(54) BATTERY CELL HAVING ELECTRODE ASSEMBLY OF STAGGERED ARRAY STRUCTURE

(71) Applicant: LG CHEM, LTD., Seoul (KR)

(72) Inventors: Sungjin Kwon, Daejeon (KR); Dong-Myung Kim, Daejeon (KR); Ki Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 329 days.

(21) Appl. No.: 14/439,092

(22) PCT Filed: Feb. 7, 2014

(86) PCT No.: PCT/KR2014/001047
§ 371 (c)(1),
(2) Date: Apr. 28, 2015

(87) PCT Pub. No.: WO2014/126358
PCT Pub. Date: Aug. 21, 2014

(65) Prior Publication Data
US 2015/0340662 A1    Nov. 26, 2015

(30) Foreign Application Priority Data

Feb. 13, 2013    (KR) .................. 10-2013-0015469

(51) Int. Cl.
*H01M 2/02*    (2006.01)
*H01M 2/26*    (2006.01)
(Continued)

(52) U.S. Cl.
CPC .......... *H01M 2/02* (2013.01); *H01M 2/0202* (2013.01); *H01M 2/263* (2013.01);
(Continued)

(58) Field of Classification Search
CPC ...... H01M 2/02; H01M 2/0202; H01M 2/263; H01M 2/0237; H01M 10/0525; H01M 10/0585; H01M 10/0587
See application file for complete search history.

(56) References Cited

U.S. PATENT DOCUMENTS

2001/0005561 A1    6/2001  Yamada et al.
2010/0015511 A1    1/2010  Yoo et al.

FOREIGN PATENT DOCUMENTS

CN    101431168 A    5/2009
EP    1 391 954 A2    2/2004
(Continued)

OTHER PUBLICATIONS

International Search Report issued in PCT/KR2014/001047, dated May 27, 2014.

*Primary Examiner* — Ula C Ruddock
*Assistant Examiner* — Thomas H. Parsons
(74) *Attorney, Agent, or Firm* — Birch, Stewart, Kolasch & Birch, LLP

(57) ABSTRACT

Disclosed herein is a battery cell configured to have a structure in which two or more electrode assemblies, each including positive electrodes, negative electrodes, and separators disposed respectively between the positive electrodes and the negative electrodes, are mounted in a battery case, wherein the electrode assemblies are stacked such that electrode terminals of the electrode assemblies are aligned in a vertical direction, one side lower edge of an upper one of the electrode assemblies is disposed in contact with a top surface of a lower one of the electrode assemblies, and one side upper edge of the lower electrode assembly is disposed in contact with a bottom surface of the upper electrode assembly at an interface between the electrode assemblies,
(Continued)

and the battery case has an internal shape corresponding to an external shape of the stacked electrode assemblies.

20 Claims, 6 Drawing Sheets

(51) Int. Cl.
*H01M 10/04* (2006.01)
*H01M 10/0525* (2010.01)
*H01M 10/0585* (2010.01)
*H01M 10/0587* (2010.01)

(52) U.S. Cl.
CPC ... *H01M 10/0445* (2013.01); *H01M 10/0525* (2013.01); *H01M 10/0585* (2013.01); *H01M 10/0587* (2013.01); *H01M 2/0237* (2013.01); *H01M 2002/0205* (2013.01); *Y02T 10/7011* (2013.01)

(56) References Cited

FOREIGN PATENT DOCUMENTS

| | | | |
|---|---|---|---|
| EP | 2858165 A1 | | 4/2015 |
| JP | 2001-167743 A | | 6/2001 |
| JP | 2003-234094 A | | 8/2003 |
| JP | 2003234094 | * | 8/2003 |
| JP | 3680797 B2 | | 8/2005 |
| KR | 2003-0066960 A | | 8/2003 |
| KR | 20030066960 | * | 8/2003 |
| KR | 10-2007-0110566 A | | 11/2007 |
| KR | 10-2012-0117306 A | | 10/2012 |
| WO | WO 2011/094286 A2 | | 8/2011 |

* cited by examiner

[FIG. 1]
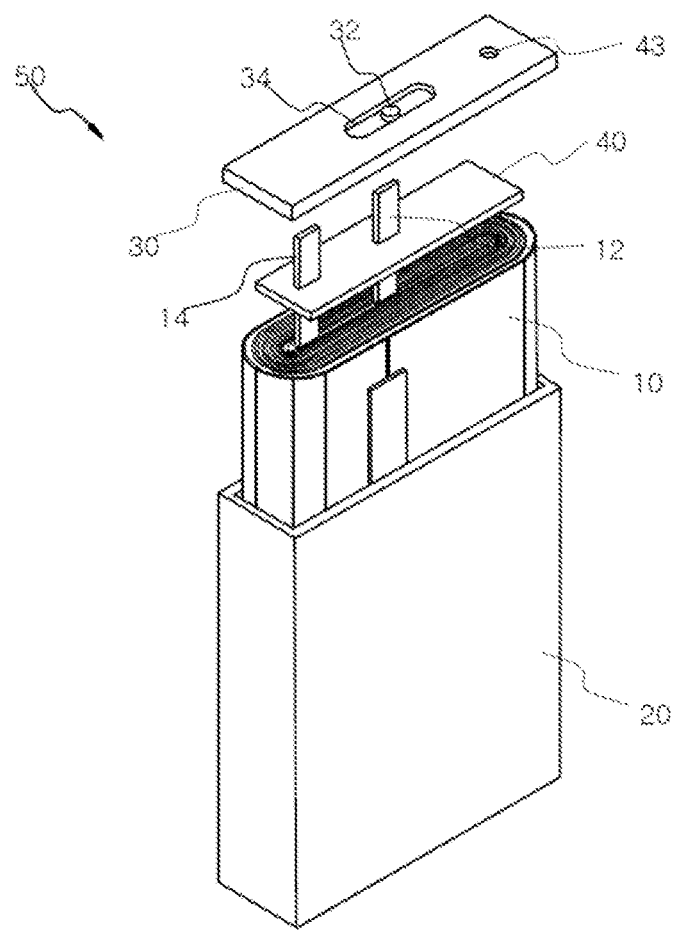

[FIG. 2]
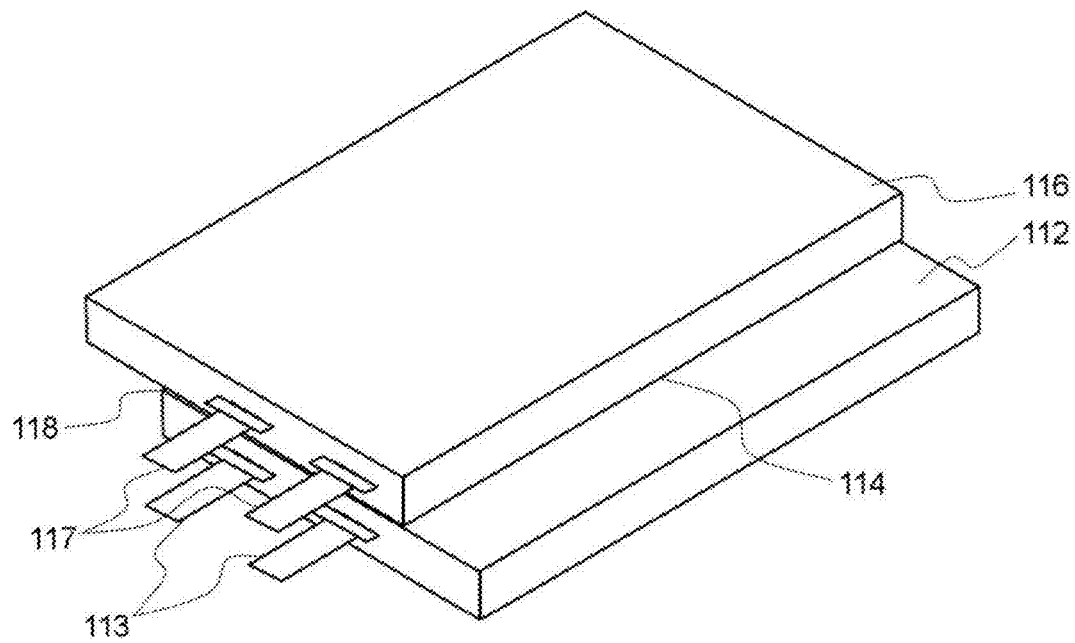
[FIG. 3]
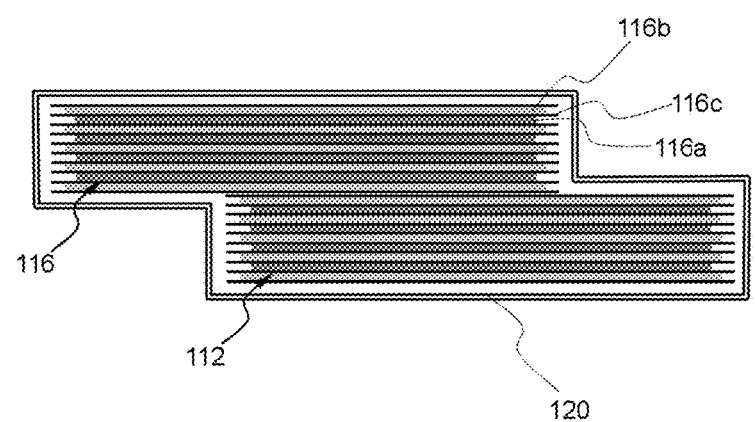

[FIG. 4]
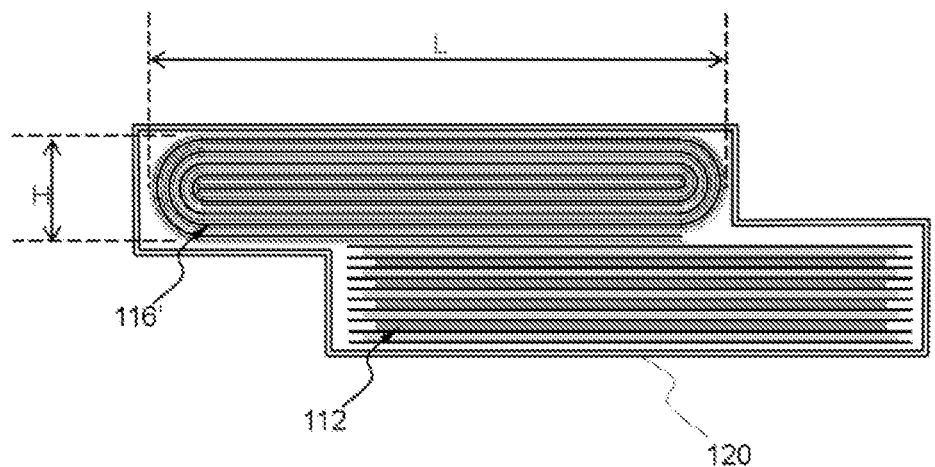
[FIG. 5]
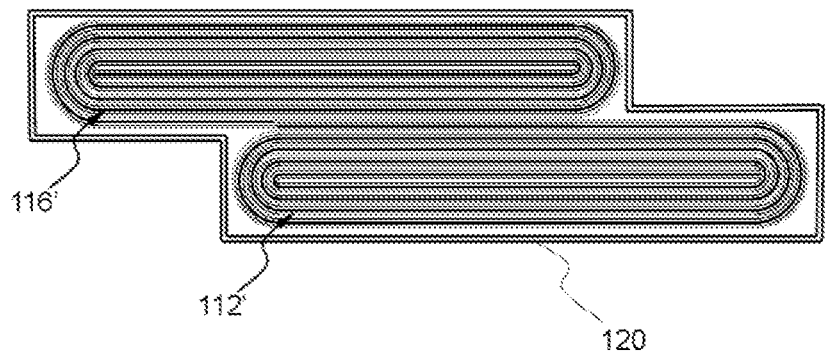

[FIG. 6]
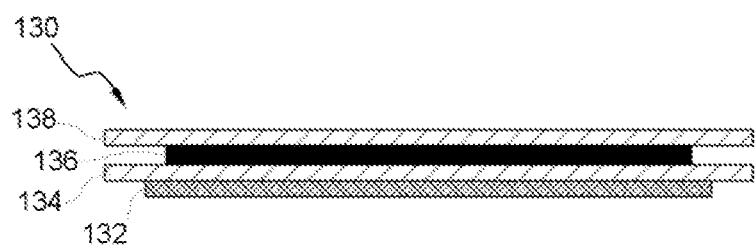
[FIG. 7]
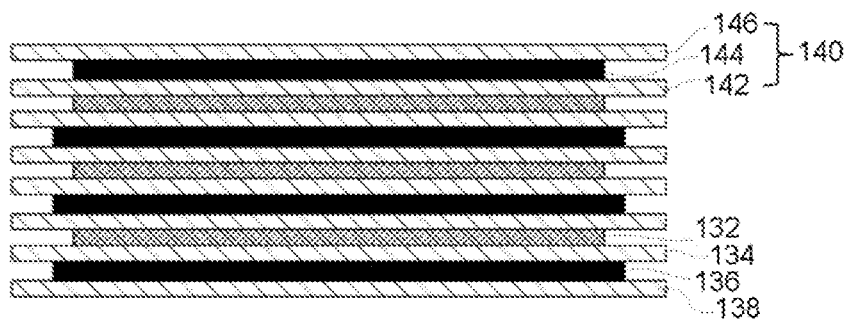

[FIG. 8]
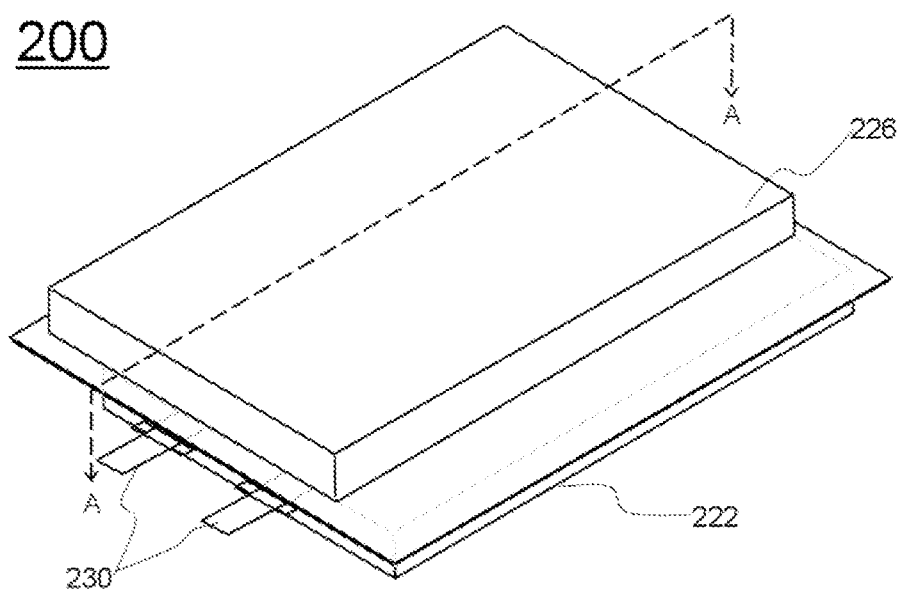

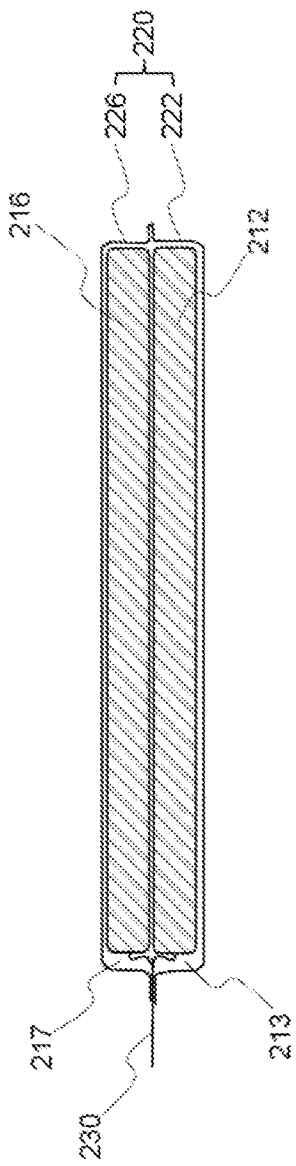
[FIG. 9]

BATTERY CELL HAVING ELECTRODE ASSEMBLY OF STAGGERED ARRAY STRUCTURE

TECHNICAL FIELD

The present invention relates to a battery cell including electrode assemblies stacked to have a staggered array structure, and more particularly to a battery cell configured to have a structure in which two or more electrode assemblies, each including positive electrodes, negative electrodes, and separators disposed respectively between the positive electrodes and the negative electrodes, are mounted in a battery case, wherein the electrode assemblies are stacked such that electrode terminals of the electrode assemblies are aligned in a vertical direction, one side lower edge of an upper one of the electrode assemblies is disposed in contact with a top surface of a lower one of the electrode assemblies, and one side upper edge of the lower electrode assembly is disposed in contact with a bottom surface of the upper electrode assembly at an interface between the electrode assemblies, and the battery case has an internal shape corresponding to an external shape of the stacked electrode assemblies.

BACKGROUND ART

With remarkable development of information technology (IT), a great variety of portable information communication devices have been popularized. As a result, in the $21^{st}$ century, we are moving toward a ubiquitous society in which high-quality information service is possible regardless of time and place.

Secondary batteries are very important to realize such a ubiquitous society. Specifically, secondary batteries, which can be charged and discharged, have been widely used as an energy source for wireless mobile devices. In addition, the secondary batteries have also been used as an energy source for electric vehicles and hybrid electric vehicles, which have been proposed to solve problems, such as air pollution, caused by existing gasoline and diesel vehicles using fossil fuel.

As devices, to which the secondary batteries are applicable, are diversified as described above, the secondary batteries have also been diversified such that the secondary batteries can provide outputs and capacities suitable for devices to which the secondary batteries are applied. In addition, there is a strong need to reduce the size and weight of the secondary batteries.

Based on the shape of a battery case, the secondary batteries may be classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

The electrode assembly mounted in the battery case functions as a power generating element, having a positive electrode/separator/negative electrode stack structure, which can be charged and discharged. The electrode assembly may be classified as a jelly-roll type electrode assembly configured to have a structure in which a long sheet type positive electrode and a long sheet type negative electrode, to which active materials are applied, are wound in a state in which a separator is disposed between the positive electrode and the negative electrode, a stacked type electrode assembly configured to have a structure in which a plurality of positive electrodes having a predetermined size and a plurality of negative electrodes having a predetermined size are sequentially stacked in a state in which separators are disposed respectively between the positive electrodes and the negative electrodes, or a stacked/folded type electrode assembly, which is a combination of the above two type electrode assemblies.

A general structure of a prismatic battery is shown in FIG. 1.

Referring to FIG. 1, a prismatic battery 50 is configured to have a structure in which a jelly-roll type electrode assembly 10 is mounted in a prismatic metal case 20, and a top cap 30, at which a protruding electrode terminal (for example, an negative electrode terminal) 32 is formed, is coupled to the open top of the case 20.

A negative electrode of the electrode assembly 10 is electrically connected to the lower end of the negative electrode terminal 32 on the top cap 30 via a negative electrode tab 12. The negative electrode terminal 32 is insulated from the top cap 30 by an insulating member 34. On the other hand, a positive electrode tab 14 of another electrode (e.g. a positive electrode) of the electrode assembly 10 is electrically connected to the top cap 30, which is made of a conductive material, such as aluminum or stainless steel, to constitute a positive electrode terminal.

In addition, in order to ensure electrical insulation between the electrode assembly 10 and the top cap 30 excluding the electrode tabs 12 and 14, a sheet type insulation member 40 is disposed between the prismatic case 20 and the electrode assembly 10, the top cap 30 is mounted to the case 20, and the top cap 30 and the case are coupled to each other by welding. Subsequently, an electrolyte is injected into the case 20 through an electrolyte injection port 43, the electrolyte injection port 43 is sealed by welding, and epoxy is applied to the welded portion. As a result, the battery is manufactured.

In recent years, however, a new type of battery cell has been required in accordance with a trend change for a slim type design or various other designs. Specifically, there is a high necessity for a battery cell configured to have a structure in which the battery cell can be efficiently mounted in a device even in a case in which the device does not have a sufficient space to receive the battery cell as a result of the reduction in size and thickness of the device.

Conventional devices are manufactured so as to have an approximately rectangular parallelepiped shape. In recent years, however, there have been developed devices having various external shapes. In a case in which a battery cell is configured to have a rectangular parallelepiped shape or a cylindrical shape, it is difficult to efficiently mount the battery cell in such devices having various external shapes.

For example, sides of a smart phone may be curved to improve grip. However, in a case in which a battery cell having a rectangular parallelepiped shape or a battery pack having a rectangular parallelepiped shape is mounted in a device designed so as to have such curved portions, space utilization of the device may be lowered.

That is, the curved portions of the device have dead spaces, in which the battery cell cannot be mounted. Ultimately, such dead spaces lower the capacity of the device per volume.

Therefore, there is a high necessity for a battery cell configured to have a structure in which the battery cell can be efficiently mounted in a device having various structures such that dead spaces are reduced, thereby maximizing the capacity of the battery cell.

DISCLOSURE

Technical Problem

The present invention has been made to solve the above problems and other technical problems that have yet to be resolved.

Specifically, it is an object of the present invention to provide a battery cell configured to have a structure in which the battery cell can be mounted in various spaces of a device, whereby it is possible to maximally utilize an internal space of the device, and the battery cell can be efficiently mounted in various external structures of the device in addition to a rectangular external structure of the device.

Technical Solution

In accordance with one aspect of the present invention, the above and other objects can be accomplished by the provision of a battery cell configured to have a structure in which two or more electrode assemblies, each including positive electrodes, negative electrodes, and separators disposed respectively between the positive electrodes and the negative electrodes, are mounted in a battery case, wherein the electrode assemblies are stacked such that electrode terminals of the electrode assemblies are aligned in a vertical direction, one side lower edge of an upper one of the electrode assemblies is disposed in contact with a top surface of a lower one of the electrode assemblies, and one side upper edge of the lower electrode assembly is disposed in contact with a bottom surface of the upper electrode assembly at an interface between the electrode assemblies, and the battery case has an internal shape corresponding to an external shape of the stacked electrode assemblies.

That is, the battery cell according to the present invention is configured to have a structure in which two or more electrode assemblies are stacked in a staggered fashion. Consequently, it is possible to manufacture battery cells having various capacities and sizes based on the above-described specific structure. In a case in which a device, in which the battery cell is mounted, is manufactured, the battery cell can be effectively mounted in various spaces of the device, whereby it is possible to maximally utilize an internal space of the device.

The electrode assemblies are not particularly restricted but may be formed to have various structures. Each of the electrode assemblies may be generally configured to have a plate-shaped hexahedral structure, the volume of which can be reduced and a space of which can be efficiently utilized when a plurality of electrode assemblies is stacked.

Each of the electrode assemblies is not particularly restricted so long as each of the electrode assemblies constitutes a positive electrode and a negative electrode. For example, each of the electrode assemblies may be configured to have a wound type structure, a stacked type structure, or a stacked/folded type structure. The details of the stacked/folded type electrode assembly are disclosed in Korean Patent Application Publication No. 2001-0082058, No. 2001-0082059, and No. 2001-0082060, which have been filed in the name of the applicant of the present patent application. The disclosures of the applications are incorporated herein by reference.

In a concrete example, each of the electrode assemblies may be a wound type, i.e. a jelly-roll type, electrode assembly having an oval shape in which the length of each of the electrode assemblies is greater than the height of each of the electrode assemblies in vertical section.

In the electrode assemblies according to the present invention, the outermost electrodes may have the same polarity or different polarities.

In a concrete example, each of the electrode assemblies may be configured to have a stacked type structure or a stacked/folded type structure in which outermost electrodes of the stacked electrode assemblies have the same polarity. Specifically, in the stacked type electrode assemblies or the stacked/folded type electrode assemblies, the uppermost electrode and the lowermost electrode of the positive electrode/separator/negative electrode stacked structure may be negative electrodes.

Meanwhile, in the stacked/folded type structure, in which the unit cells are folded and stacked, it is difficult to accurately achieve alignment of the electrode assemblies which are arranged in a vertical direction, whereby it is hard to manufacture reliable and high-quality electrode assemblies.

In order to solve the above problem, the electrode assemblies may be configured to have a laminated and stacked type structure. In the laminated and stacked type structure, one or more radical cells, each of which is configured to have a structure in which a negative electrode, a separator, a positive electrode, and a separator are sequentially stacked or a structure in which a positive electrode, a separator, a negative electrode, and a separator are sequentially stacked, are stacked. Consequently, it is possible to form the electrode assemblies using a process of simply stacking the radical cells without using a process of folding full cells or bi-cells to manufacture the electrode assemblies, thereby simplifying the electrode assembly manufacturing process.

In each of the electrode assemblies, a radical final cell, which is configured to have a structure in which a separator, a negative electrode, and a separator are sequentially stacked, may be disposed at the upper end of a structure in which a plurality of radical cells is stacked.

In the battery cell according to the present invention, the electrode assemblies may be configured to have the wound type structure, the stacked type structure, the stacked/folded type structure, or the laminated and stacked type structure as described above. Alternatively, electrode assemblies configured to have a combination of two or more selected from among the wound type structure, the stacked type structure, the stacked/folded type structure, and the laminated and stacked type structure may be mounted in the battery case.

The electrode assemblies may be stacked such that the electrode terminals are arranged in the same direction. In the electrode terminals arranged in the same direction, therefore, positive electrode terminals and the negative electrode terminals may be connected to each other.

At this time, ends of the electrode assemblies from which the electrode terminals protrude may be adjacent to each other in a vertical direction. When the electrode assemblies are stacked, therefore, the electrode terminals may be easily connected to each other.

As previously described, the electrode assemblies are stacked to have a structure in which one side lower edge of the upper electrode assembly is disposed in contact with the top surface of the lower electrode assembly, and one side upper edge of the lower electrode assembly is disposed in contact with the bottom surface of the upper electrode assembly. At this time, one side lower edge of the upper electrode assembly disposed in contact with the top surface of the lower electrode assembly or one side upper edge of the lower electrode assembly disposed in contact with the bottom surface of the upper electrode assembly may be one of the edges of the electrode assemblies formed in a direction perpendicular to a direction in which the electrode terminals protrude. In this structure, the electrode assemblies are stacked in a staggered shape.

For example, the electrode assemblies may be stacked in a staggered shape, and the bottom surface of the upper electrode assembly may be disposed in contact with the top surface of the lower electrode assembly by 20 to 95%, specifically 25 to 90%, more specifically 30 to 85%, of an area thereof.

The electrode assemblies may have the same size. Alternatively, at least two of the electrode assemblies may have different sizes. However, the size and shape of the electrode assemblies are not particularly restricted.

For example, two stacked electrode assemblies may be different from each other in terms of at least one selected from among a thickness, a breadth (horizontal length), and a width (vertical length).

The battery case may be a battery case made of a laminate sheet including a resin layer and a metal layer or a metal can.

The metal can type battery case may be made of a metal material or a plastic material. The pouch-shaped battery case may be made of a laminate sheet including a resin layer and a metal layer.

The laminate sheet may be configured to have a structure in which resin layers are applied to opposite major surfaces of a metal blocking layer. For example, the laminate sheet may be configured to have a structure in which an outer resin layer exhibiting high durability is attached to one major surface (outer surface) of the metal blocking layer and a resin sealant layer exhibiting a high thermal bonding property is attached to the other major surface (inner surface) of the metal blocking layer.

In a concrete example, the metal blocking layer may be made of aluminum exhibiting a gas blocking property and sufficient ductility to configure in the form of a thin film.

It is required for the outer resin layer to exhibit high resistance against external environment. For this reason, the outer resin layer may be made of a polymer resin, such as polyethylene terephthalate (PET) or oriented nylon film, exhibiting more than predetermined tensile strength and weather resistance.

In addition, the resin sealant layer may be made of a cast polypropylene (CPP) resin which exhibits a high thermal bonding property (thermal adhesion property) and a low hygroscopic property, which is necessary to restrain permeation of an electrolyte, and is not expanded nor corroded by the electrolyte.

In general, the can-shaped battery case may be sealed by welding in a state in which at least one end of the can-shaped battery case open to introduce the electrode assemblies is covered by a cover. In the pouch-shaped battery case, on the other hand, the outer edge of the receiving unit may be sealed by thermal bonding.

The battery case made of the laminate sheet or the metal can may be provided with a receiving unit, in which the electrode assemblies having the above-mentioned unique structure according to the present invention are mounted. The receiving unit may have a stepped structure having a width and a height corresponding to the shape of the electrode assemblies having the unique structure according to the present invention.

For example, in a case in which the battery case is made of the laminate sheet, the battery case may include an upper case and a lower case, and the upper case and the lower case may be provided with receiving units corresponding to the external shape of the stacked electrode assemblies, the upper case and the lower case being coupled to each other such that the stacked electrode assemblies are received in the receiving units in a sealed space.

The battery cell may be a lithium ion battery cell or a lithium ion polymer battery cell. However, the present invention is not limited thereto.

In accordance with another aspect of the present invention, there is provided a device including the battery cell with the above-stated construction as a power source. The device may be any one selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing a conventional representative prismatic battery;

FIG. 2 is a perspective view showing a stacked structure of electrode assemblies constituting a battery cell according to an embodiment of the present invention;

FIG. 3 is a vertical sectional view showing a structure in which the electrode assemblies of FIG. 2 are mounted in a battery case;

FIG. 4 is a vertical sectional view showing a battery cell according to another embodiment of the present invention;

FIG. 5 is a vertical sectional view showing a battery cell according to another embodiment of the present invention;

FIG. 6 is a vertical sectional view showing a radical cell constituting a laminated and stacked type electrode assembly;

FIG. 7 is a vertical sectional view showing a laminated and stacked type electrode assembly;

FIG. 8 is a perspective view showing a battery cell according to a further embodiment of the present invention; and FIG. 9 is a vertical sectional view taken along line A-A of FIG. 8.

BEST MODE

Now, exemplary embodiments of the present invention will be described in detail with reference to the accompanying drawings. It should be noted, however, that the scope of the present invention is not limited by the illustrated embodiments.

FIG. 2 is a perspective view showing a stacked structure of electrode assemblies constituting a battery cell according to an embodiment of the present invention, and FIG. 3 is a vertical sectional view showing a structure in which the electrode assemblies of FIG. 2 are mounted in a battery case.

Referring to FIGS. 2 and 3, a first electrode assembly 112 and a second electrode assembly 116 each are configured to have a plate-shaped hexahedral structure. The first electrode assembly 112 and the second electrode assembly 116 are stacked such that electrode terminals 113 and 117 are aligned in a vertical direction. At an interface between the first electrode assembly 112 and the second electrode assembly 116, one side lower edge 114 of the second electrode assembly 116, which is an upper one of the electrode assemblies, is disposed in contact with the top surface of the first electrode assembly 112, which is a lower one of the electrode assemblies, and one side upper edge 118 of the first electrode assembly 112 is disposed in contact with the bottom surface of the second electrode assembly 116.

In addition, the first electrode assembly 112 and the second electrode assembly 116 are stacked such that the electrode terminals 113 and 117 are arranged in the same direction. The electrode terminals 113 and 117 are electrically connected to each other such that the electrode terminals having the same polarities are connected to each other. Furthermore, ends of the first electrode assembly 112 and the second electrode assembly 116 from which the electrode terminals 113 and 117 protrude are adjacent to each other in a vertical direction such that the electrode terminals can be easily connected to each other.

The electrode assemblies 100 are stacked electrode assemblies configured to have a structure in which positive electrodes 116a and negative electrodes 116b are stacked in a state in which separators 116c are disposed respectively between the positive electrodes 116a and the negative electrodes 116b. A separator 116c and a negative electrode 116b are disposed at outermost sides of the electrode assemblies 112 and 116.

The battery case 120 has an internal shape corresponding to an external shape of the stacked electrode assemblies 112 and 116. In addition, the battery case 120 has a stepped structure having a width and a height corresponding to the shape of each of the electrode assemblies 112 and 116.

As shown, the first electrode assembly 112 and the second electrode assembly 116 are stacked in a staggered shape. Consequently, it is possible to manufacture battery cells having various capacities and sizes based on the above-described structure. The battery cells can be effectively mounted in various spaces of a device, whereby it is possible to maximally utilize an internal space of the device.

For reference, in the accompanying drawings, a structure in which outermost electrodes of the stacked electrode assemblies have the same polarity is illustrated for the convenience of description. Alternatively, a structure in which outermost electrodes of the stacked electrode assemblies have different polarities may be used.

FIGS. 4 and 5 are vertical sectional views showing battery cells according to other embodiments of the present invention.

Referring to FIG. 4, a second electrode assembly 116', which is an upper one of the electrode assemblies, is a jelly-roll type electrode assembly having an oval shape in which a length L of second electrode assembly 116' is greater than a height H of the second electrode assembly 116' unlike FIG. 3. Referring to FIG. 5, on the other hand, both a first electrode assembly 112' and a second electrode assembly 116' are jelly-roll type electrode assemblies. Alternatively, although not shown, at least one stacked/folded type electrode assembly may be included. In other words, a jelly-roll type electrode assembly, a stacked type electrode assembly, or a stacked/folded type electrode assembly may be used as at least one of the electrode assemblies received in the battery case 120. For reference, the stacked/folded type electrode assembly is configured to have a structure in which unit cells, each of which includes positive electrodes and negative electrodes sequentially stacked in a state in which separators are disposed respectively between the positive electrodes and the negative electrodes, are folded using a separation film. The unit cells may be classified into bi-cells configured such that the outermost electrodes have the same polarity and full cells configured such that the outermost electrodes have different polarities.

FIG. 6 is a vertical sectional view showing a radical cell constituting a laminated and stacked type electrode assembly, and FIG. 7 is a vertical sectional view showing a laminated and stacked type electrode assembly.

Referring to FIGS. 6 and 7, a radical cell 130 is configured to have a structure in which a negative electrode 132, a separator 134, a positive electrode 136, and a separator 138 are sequentially stacked. A radical final cell 140, which is configured to have a structure in which a separator 142, a negative electrode 144, and a separator 146 are stacked, is stacked on the uppermost end of a structure in which a plurality of radical cells 130 is stacked. It is possible to manufacture a more stable and reliable electrode assembly by the provision of the radical final cell 140. In a case in which the radical cells 130 and the radical final cell 140 are stacked as described above, it is possible to prevent the occurrence of an alignment error of an electrode assembly manufactured through a folding process and to avoid the necessity of using processing facilities (laminators and folding equipment). That is, radical cells may be formed using only one laminator, and the radical cells may be simply stacked to manufacture an electrode assembly. Consequently, damage to electrodes which is caused during the folding process may be reduced, and wetting characteristics of the battery cell may be improved.

FIG. 8 is a perspective view showing a battery cell according to a further embodiment of the present invention, and FIG. 9 is a vertical sectional view taken along line A-A of FIG. 8.

Referring to FIGS. 8 and 9, a battery cell 200 is configured to have a structure in which electrode assemblies 212 and 216 are mounted in a pouch-shaped battery case 220 made of a laminate sheet. Electrode leads 230 electrically connected to the electrode assemblies 212 and 216 protrude outward from the battery case 220. The battery case 220 includes an upper case 226 and a lower case 222. The upper case 226 and the lower case 222 are provided with a second receiving unit 217 and a first receiving unit 213, in which the second electrode assembly 216 and the first electrode assembly 212 are mounted, respectively.

The first receiving unit 213 and the second receiving unit 217 of the battery case 220, each of which is formed in a rectangular shape when viewed in a plan view, are staggered. The battery case 220 has an internal shape corresponding to external shapes of the first electrode assembly 212 and the second electrode assembly 216.

The first electrode assembly 212 and the second electrode assembly 216, which have the same size, are stacked in a height direction when viewed in a plan view. The first electrode assembly 212 and the second electrode assembly 216 are located in the first receiving unit 213 and the second receiving unit 217 of the battery case 220, respectively.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery cell according to the present invention is configured to have a structure in which two or more electrode assemblies are stacked in a staggered fashion, and the battery cell has an external shape corresponding to the stacked structure of the electrode assemblies. Consequently, it is possible to easily secure an installation space of the battery cell and to utilize a dead space of a device, thereby maximizing space utilization. In addition, it is possible to use a high-capacity battery cell in a device, thereby further miniaturizing the device.

The invention claimed is:

1. A battery cell configured to have a structure in which two or more electrode assemblies, each comprising positive electrodes, negative electrodes, and separators disposed respectively between the positive electrodes and the negative electrodes, are mounted in a battery case, wherein
    the electrode assemblies are stacked such that electrode terminals of the electrode assemblies are aligned to overlap in a vertical direction,
    one side lower edge of an upper one of the electrode assemblies is disposed in contact with a top surface of a lower one of the electrode assemblies, and one side upper edge of the lower electrode assembly is disposed in contact with a bottom surface of the upper electrode assembly at an interface between the electrode assemblies such that the upper electrode assembly is offset relative to the lower electrode assembly,
    the battery case has an internal shape corresponding to an external shape of the stacked electrode assemblies, and
    the electrode assemblies are configured to have a combination of two different electrode assembly types selected from among a jelly-roll type electrode assembly, a stacked type electrode assembly, a stacked/folded type electrode assembly, or a laminated and stacked type electrode assembly.

2. The battery cell according to claim 1, wherein each of the electrode assemblies is generally configured to have a plate-shaped hexahedral structure.

3. The battery cell according to claim 1, wherein one of the electrode assemblies is configured to have a wound type structure, a stacked type structure, or a stacked/folded type structure.

4. The battery cell according to claim 3, wherein at least one of the electrode assemblies is the jelly-roll type electrode assembly, the jelly roll type electrode assembly having an oval shape in which a length of each of the electrode assemblies is greater than a height of each of the electrode assemblies in vertical section.

5. The battery cell according to claim 3, wherein another of the electrode assemblies is configured to have a stacked type structure or a stacked/folded type structure in which outermost electrodes of the stacked electrode assemblies have the same polarity, and wherein the one of the electrode assemblies is a different type of electrode assemblies of that of the another of the electrode assemblies.

6. The battery cell according to claim 5, wherein each of the outermost electrodes of the stacked electrode assemblies is a negative electrode.

7. The battery cell according to claim 1, wherein the electrode assemblies are stacked such that all of the electrode terminals are arranged in the same direction.

8. The battery cell according to claim 7, wherein ends of the electrode assemblies from which the electrode terminals protrude are adjacent to each other in a vertical direction.

9. The battery cell according to claim 1, wherein one side lower edge of the upper electrode assembly disposed in contact with the top surface of the lower electrode assembly, and one side upper edge of the lower electrode assembly disposed in contact with the bottom surface of the upper electrode assembly, are one of the edges of the electrode assemblies formed in a direction perpendicular to a direction in which the electrode terminals protrude, respectively.

10. The battery cell according to claim 1, wherein the electrode assemblies have the same size.

11. The battery cell according to claim 1, wherein at least two of the electrode assemblies are different from each other in terms of at least one selected from among a thickness, a breadth (horizontal length), and a width (vertical length).

12. The battery cell according to claim 1, wherein the bottom surface of the upper electrode assembly is disposed in contact with the top surface of the lower electrode assembly by 20% to 95% of an area thereof.

13. The battery cell according to claim 1, wherein the battery case is a battery case made of a laminate sheet comprising a resin layer and a metal layer, or a metal can.

14. The battery cell according to claim 13, wherein the battery case made of the laminate sheet or the metal can is provided with a receiving unit having a stepped structure in width and height.

15. The battery cell according to claim 14, wherein the battery case made of the laminate sheet comprises an upper case and a lower case, and the upper case and the lower case are provided with receiving units corresponding to the external shape of the stacked electrode assemblies, the upper case and the lower case being coupled to each other such that the stacked electrode assemblies are received in the receiving units in a sealed space.

16. The battery cell according to claim 1, wherein the battery cell is a lithium ion battery cell or a lithium ion polymer battery cell.

17. A device comprising a battery cell according to claim 1 as a power source.

18. The device according to claim 17, wherein the device is selected from a group consisting of a mobile phone, a portable computer, a smart phone, a tablet PC, a smart pad, a netbook computer, a light electronic vehicle (LEV), an electric vehicle, a hybrid electric vehicle, a plug-in hybrid electric vehicle, and a power storage device.

19. The battery cell assembly according to claim 1, wherein one of the electrode assemblies is the jelly-roll type electrode assembly and another of the electrode assemblies is selected from among the stacked type electrode assembly, the stacked/folded type electrode assembly, or the laminated and stacked type electrode assembly.

20. A battery cell configured to have a structure in which two or more electrode assemblies, each comprising positive electrodes, negative electrodes, and separators disposed respectively between the positive electrodes and the negative electrodes, are mounted in a battery case, wherein
    the electrode assemblies are stacked such that electrode terminals of the electrode assemblies are aligned in a vertical direction,
    an upper one of the electrode assemblies is shifted relative to a lower one of the electrode assemblies such that a portion of the upper electrode assembly does not overlap the lower electrode assembly, and
    the electrode assemblies are configured to have a combination of two different electrode assembly types selected from among a jelly-roll type electrode assembly, a stacked type electrode assembly, a stacked/folded type electrode assembly, or a laminated and stacked type electrode assembly.

* * * * *